United States Patent [19]
Derolf et al.

[11] 3,966,893
[45] June 29, 1976

[54] PRECIPITATING α ALUMINA MONOHYDRATE

[75] Inventors: M. Robert Derolf, Blackwood, N.J.; Elliot P. Hertzenberg, Wilmington, Del.

[73] Assignee: Philadelphia Quartz Company, Valley Forge, Pa.

[22] Filed: Dec. 2, 1974

[21] Appl. No.: 528,823

[52] U.S. Cl. .............................. 423/628; 423/630; 423/631
[51] Int. Cl.² ..................... C01F 7/02; C01F 7/34
[58] Field of Search ........... 423/625, 628, 630, 631; 252/309, 313

[56] References Cited
UNITED STATES PATENTS

| | | | |
|---|---|---|---|
| 2,590,833 | 4/1952 | Bechtold et al. | 423/631 |
| 2,697,066 | 12/1954 | Sieg | 423/628 |
| 2,888,323 | 5/1959 | Teichner | 423/628 |
| 3,252,636 | 11/1967 | Wilson et al. | 423/630 |
| 3,325,247 | 6/1967 | Magee et al. | 423/628 |

*Primary Examiner*—Herbert T. Carter
*Attorney, Agent, or Firm*—Fred Philpitt; Ernest Posner

[57] ABSTRACT

Dispersible colloidal particles of α alumina monohydrate are prepared by conditioning aqueous solutions of an aluminum salt with an organic solvent and the precipitating alumina with an aqueous solution of base. The reaction mixture is heated under pressure, filtered, washed and dried to obtain the product.

12 Claims, No Drawings

PRECIPITATING α ALUMINA MONOHYDRATE

BACKGROUND

This invention relates to the preparation of alumina monohydrate more particularly it involves the preparation of dispersible alumina monohydrate by precipitation from a solution of aluminum sulfate.

Finely divided aluminas have been prepared by numerous methods and these methods can be represented by U.S. Pat. Nos. 2,787,522; 2,915,475 and 3,357,791. In U.S. Pat. No. 2,915,475 to Bugosh, fibrous alumina monohydrate is prepared by heat and pressure treatment of a colloidal dispersion of alumina in the presence of strong acids.

SUMMARY OF THE INVENTION

We have found that dispersible colloidal sized particles of α alumina monohydrate can be prepared by conditioning a solution of a soluble aluminum salt of a strong acid with an organic solvent usually an alcohol and then precipitating the alumina with a solution of a base usually ammonia. The precipitate and the remainder of the reaction mixture are heated under pressure, filtered, washed and dried to obtain the desired product.

THE INVENTION

The source of alumina utilized in the process of this invention can be any water soluble salt of aluminum and a strong acid. Examples of such salts include aluminum chloride, aluminum nitrate, aluminum sulfate and aluminum sulfamate. The aluminum salt is used as a solution and its concentration can be 12 to 43%. We prefer to use aluminum sulfate. The aluminum sulfate is utilized as an aqueous solution of 15 to 37% $Al_2(SO_4)_3$.

The solution of $Al_2(SO_4)_3$ is mixed with a conditioning agent which is a water miscible organic solvent. Numerous types of solvents can be used such as ketones or aldehydes but we prefer to use alcohols including methanol, ethanol, propanol and iso-propanol. The aluminum salt solution must be mixed with sufficient conditioning agent to promote the formation of colloidal sized particles upon precipitation of the alumina. An excess of the agent must be avoided to prevent salting out of the solution. In general, we have found that conditioned solutions containing 5 to 50% of the conditioning agent produce the desired particles.

The conditioned solution is then mixed with an aqueous solution of base to precipitate the alumina. Examples of precipitating agents that can be used include solutions of sodium hydroxide, potassium hydroxide, ammonia and certain amines. The strength of the aqueous solution of base should be sufficient to provide a pH value of 8.7 to 10.2 during the precipitation without undue dilution of the conditioned solution. We have found full strength commercial ammonia solutions of 29% $NH_3$ to be very satisfactory.

The reaction mixture which now contains a significant precipitate is now diluted with water at a temperature between room temperature and just below the boiling point of the conditioning agent. The amount of water required is ½ to 5/6 of the weight of the aluminum salt solution originally used. After dilution, the reaction mixture is agitated for a period sufficient to assure uniformity usually about 6 to 25 minutes. The temperature of the reaction mixture during this period can be room temperature to just below the boiling point of the conditioning agent.

The precipitate and liquid components of the reaction mix are then placed in an autoclave and heat treated for a period of time. The material is held at 140° to 200°C for a period of ¼ to 1½ hours. The slurry is then cooled to room temperature in the autoclave, filtered and washed free of the sulfate. The washed material is bulk dried in a rotary dryer or similar device at 50° to 105°c for ¼ to 24 hours. The washed material can also be slurried in water and spray dried at an inlet temperature of 250 to 470°C and an outlet temperature of 95° to 210°C.

The dried product is a white free-flowing powder of very fine particle size. It contains 20 to 30% water and this difference from the theoretical value for α alumina monohydrate is the result of some surface water remaining in the product. The product is almost completely dispersed when preparing dispersions that contain about 0.4% HCl and about 7 to 8% $Al_2O_3$. Numerous other compositions for such dispersions would also be suitable. The dispersed particle size for the product appears to be 100 to 200 A as determined by electron microscopy.

It is also possible to condition the aluminum salt solution with inorganic materials prior to the precipitation of the alumina. We have found that addition of controlled amounts of neutral and basic salts can condition the solution and upon precipitation particles of controlled particle size are produced. Examples of such salts include ammonium carbonate, ammonium acetate, sodium sulfamate, sodium acetate, sodium carbonate and other.

The dispersions made with the product of this invention can be used for coating paper to impart anti-skid properties, while the solid can be used as a catalyst carrier.

EXAMPLES

The following examples illustrate certain embodiments of the invention and should not be considered limiting. All proportions are in parts by weight (pbw) unless otherwise indicated.

EXAMPLE 1

A technical grade solution of aluminum sulfate with 23.75% $Al_2(SO_4)_3$ was fed through tubing at about 70 pbw/minute to an agitated reaction vessel containing 207.5 pbw of water. The aluminum sulfate solution was conditioned by mixing with isopropyl alcohol added through a Y tube at a rate of about 4 pbw/minute. The conditioned solution is precipitated by the addition of aqueous ammonia (29% $NH_3$) through a second Y tube just prior to injection into the reaction vessel. The ammonia was added at a rate of about 26 pbw/minute. In this example the addition and initial mixing of the reactants required about 5 minutes so that the reaction mixture consisted of:

| | |
|---|---|
| Aluminum sulfate solution; 23.75% $Al_2(SO_4)_3$ | 352.8 phw |
| Isopropyl alcohol | 21.2 " |
| Aqueous ammonia, 29% $NH_3$ | 130.4 " |
| Water | 207.5 |

The reaction mixture now containing a precipitate of alumina and having a pH of 9.5 was agitated in the reaction vessel for 15 minutes before it was transferred to an agitated autoclave for heat treatment at 160°C for ½ hour. The contents of the autoclave were cooled to room temperature by circulating tap water through the cooling coils. The product was filtered, washed essentially free of sulfates and bulk dried at 60°C in an oven for 24 hours. IR and X-ray analysis indicated the product to be α-alumina monohydrate and it has the following composition.

| | |
|---|---|
| $Al_2O_3$ (%) | 71.30 |
| Loss on Ignition (%) | 28.73 |
| $(SO_4)^-$ (%) | 0.003 |

This analysis indicates the product to be α-alumina monohydrate with some added surface and bound water. The surface area was 224 m²/g and more than 95% of the product was dispersed when a dispersion is prepared with 7 to 8% $Al_2O_3$ solids and 0.4% HCl. The dispersed particle size was found to be between 100 and 200A by electron microscopy.

EXAMPLE 2

The aluminum sulfate solution described in Example 1 (352.8 pbw) was mixed with 22 pbw of ethanol and then 130.4 pbw of 29% aqueous ammonia. This mixture was poured into an agitated reaction vessel equipped with a water cooled reflux condenser and containing 207.5 pbw of water heated to 95°C. Upon addition of the reaction mixture the temperature was reduced to about 45°C. The temperature was raised to about 75°C during 15 minutes of mixing. Then the reaction mixture was autoclaved at 160°C for 30 minutes. The contents of the autoclave were allowed to cool to room temperature, filtered and washed free of sulfates. The filter cake was dried in a rotary drum dryer at 95°C for 20 minutes. IR and X-ray analysis indicated the product to be α-alumina monohydrate and it has the following composition.

| | |
|---|---|
| $Al_2O_3$ (%) | 74.62 |
| Loss on Ignition (%) | 25.31 |
| $(SO_4)$ (%) | 0.004 |

This composition indicates the product to be α-alumina monohydrate with some added surface or bound water. The surface area was 249 m²/g and more than 95% of the product dispersed under the dispersion conditions described in Example 1.

EXAMPLE 3

A solution of aluminum sulfate was prepared from solid aluminum sulfate used in water treatment. The solution contained 23.03% $Al_2(SO_4)_3$ and was fed through tubing at about 65 pbw/minute to an agitated reaction vessel containing 204.5 pbw of water heated to 95°C. The aluminum sulfate solution was conditioned by mixing with isopropyl alcohol added to the flowing solution through a Y tube at a rate of about 6 pbw/minute. The conditioned solution was precipitated by the addition of aqueous ammonia (29% $NH_3$) through a second Y tube just before injection into the reaction vessel. The ammonia was added at a rate of about 25 pbw/minute. The addition and initial mixing of the reactant required about 5 minutes and the reaction mixture consisted of:

| | |
|---|---|
| Aluminum Sulfate Solution, 23.03% $Al_2(SO_4)_3$ | 332.3 pbw |
| Isopropyl alcohol | 30.8 " |
| Aqueous Ammonia, 39% $NH_3$ | 125.6 " |
| $H_2O$ | 204.5 " |

The reaction mixture attained a temperature of 85°C during the 15 minute mixing period. The reaction mixture was autoclaved for 30 minutes at 160°C. After this treatment the reaction mixture was cooled, filtered, washed free of sulfates and bulk dried in an oven at 60°C for 24 hours. IR and X-ray analysis indicated the product to be α-alumina monohydrate and it has the following composition.

| | |
|---|---|
| $Al_2O_3$ (%) | 75.01 |
| Loss on Ignition (%) | 25.07 |
| $(SO_4)^-$(%) | 0.47 |

This analysis indicates the product to be α-alumina monohydrate with some added surface and bound water. The surface area was 239 m²/g and more than 95% of the product was dispersed under the conditions described in Example 1.

We claim:
1. A method of preparing dispersible colloidal sized particles of α alumina monohydrate comprising:
   a. preparing an aqueous solution of an aluminum salt of a strong acid;
   b. conditioning said solution by mixing it with a water miscible organic solvent selected from the group consisting of water miscible aldehydes, ketones and alcohols;
   c. mixing the conditioned solution with an aqueous solution of base, thereby forming a mixture of a precipitate and a supernatant liquid;
   d. diluting said precipitate and supernatant liquid with water at a temperature between room temperature and just below the boiling point of the organic solvent;
   e. agitating and heating the diluted precipitate and supernatant at a temperature between room temperature and just below the boiling point of the organic solvent for 6 to 25 minutes;
   f. further heating the diluted precipitate and supernatant liquid at a temperature of 140 to 200°C in an autoclave for ¼ to 1½ hours;
   g. cooling, filtering and washing the precipitate; and
   h. drying the washed precipitate to obtain the product.

2. The method of claim 1 wherein the aluminum salt is selected from the group consisting of aluminum chloride, aluminum nitrate, aluminum sulfate, and aluminum sulfamate and the concentration of said solution is 12 to 43%.

3. The method of claim 1 wherein the aluminum salt is aluminum sulfate and the concentration of said solution is 12 to 37% $Al_2(SO_4)_3$.

4. The method of claim 1 wherein the organic solvent is an alcohol selected from the group consisting of methanol, ethanol, propanol and iso-propanol and the conditioned solution contains 5 to 50% of said alcohols.

5. The process of claim 1 wherein the base is selected from the group consisting of sodium hydroxide, potassium hydroxide and ammonia, and sufficient base is added to provide a pH value of 8.7 to 10.2.

6. The process of claim 1 wherein the washed precipitate is dried at 50° to 105°C for ¼ to 24 hours.

7. The process of claim 1 wherein the washed precipitate is slurried in water and spray dried at inlet temperature of 250° to 470°C and an outlet temperature of 95° to 210°C.

8. The method of claim 1 wherein the precipitate and supernatant liquid formed in step (c) and diluted with water in an amount that is equal to ½ to 5/6 of the weight of the aluminum salt solution.

9. A method of preparing dispersible colloidal sized particles of alumina monohydrate comprising:
   a. preparing an aqueous solution of an aluminum salt of a strong acid, said aluminum salt being selected from the group consisting of aluminum chloride, aluminum nitrate, aluminum sulfate and aluminum sulfamate and the concentration of said solution being 12 to 43%;
   b. conditioning said aqueous solution by mixing it with water miscible alcohol selected from the group consisting of methanol, ethanol, propanol and iso-propanol, said alcohol being added in an amount sufficient to provide 5 to 50% of the conditioned solution;
   c. mixing the conditioned solution with an aqueous solution of base selected from the group consisting of sodium hydroxide, potassium hydroxide and ammonia, wherein sufficient of the base is added to provide a pH value of 8.7 to 10.2, thereby forming a mixture of a precipitate and a supernatant liquid;
   d. diluting said precipitate and supernatant liquid with water at a temperature between room temperature and just below the boiling point of the organic solvent, the amount of water added being equal to ½ to 5/6 of the weight of the aluminum salt solution;
   e. agitating and heating the diluted precipitated and supernatant liquid at a temperature between room temperature and just below the boiling point of the organic solvent for 6 to 25 minutes;
   f. further heating the diluted precipitate and supernatant liquid at a temperature of 140 to 200°C in an autoclave for ¼ to 1½ hours;
   g. cooling, filtering and washing the precipitate; and
   h. drying the washed precipitate to obtain the product.

10. The method of claim 9 wherein the aluminum salt is aluminum sulfate and the concentration of said solution is 12 to 37% $Al_2(SO_4)_3$.

11. The method of claim 10 wherein the washed precipitate is dried at 50° to 105°C for ¼ to 24 hours.

12. The method of claim 10 wherein the washed precipitate is slurried in water and spray dried at an inlet temperature of 250° to 470°C and an outlet temperature of 95° to 210°C.

* * * * *